United States Patent
Bao et al.

(10) Patent No.: US 9,242,201 B2
(45) Date of Patent: Jan. 26, 2016

(54) FILTER MEDIUM FOR AIR FILTER AND FILTER UNIT

(75) Inventors: Li Bao, Yuki (JP); Makoto Kobayashi, Yuki (JP); Jun Morita, Yuki (JP); Tatsumi Sakano, Yuki (JP); Osamu Kitayama, Yuki (JP); Satoshi Hara, Yuki (JP); Hitoshi Niinuma, Yuki (JP)

(73) Assignee: Daikin Industries, Ltd., Osaka (JP)

( * ) Notice: Subject to any disclaimer, the term of this patent is extended or adjusted under 35 U.S.C. 154(b) by 40 days.

(21) Appl. No.: 14/241,029

(22) PCT Filed: Aug. 30, 2012

(86) PCT No.: PCT/JP2012/005497
§ 371 (c)(1),
(2), (4) Date: Feb. 25, 2014

(87) PCT Pub. No.: WO2013/031228
PCT Pub. Date: Mar. 7, 2013

(65) Prior Publication Data
US 2014/0223872 A1     Aug. 14, 2014

(30) Foreign Application Priority Data
Aug. 31, 2011     (JP) ................... 2011-190200

(51) Int. Cl.
*B01D 46/52*     (2006.01)
*B01D 39/16*     (2006.01)
(Continued)

(52) U.S. Cl.
CPC ............. *B01D 46/523* (2013.01); *B01D 39/16* (2013.01); *B01D 39/1623* (2013.01); *B01D 39/1692* (2013.01); *B01D 46/52* (2013.01); *B01D 46/521* (2013.01); *B01D 46/54* (2013.01); *B01D 46/543* (2013.01); *B32B 5/022* (2013.01); *B32B 5/26* (2013.01); *B32B 7/12* (2013.01); *B32B 2262/0238* (2013.01);
(Continued)

(58) Field of Classification Search
CPC ............... B01D 46/523; B01D 46/543; B01D 2239/065; B01D 2239/0654; B01D 2239/0677
See application file for complete search history.

(56) References Cited

U.S. PATENT DOCUMENTS

2008/0307971 A1 *  12/2008  Horie et al. ............... 95/287
2009/0139405 A1     6/2009  Schwarz et al.
(Continued)

FOREIGN PATENT DOCUMENTS

CN     101223838 A     7/2008
EP     1 750 493 A1    2/2007
(Continued)

OTHER PUBLICATIONS

International Preliminary Report of corresponding PCT Application No. PCT/JP2012/005497.
(Continued)

*Primary Examiner* — Robert Clemente
(74) *Attorney, Agent, or Firm* — Global IP Counselors (57) ABSTRACT

A filter medium for an air filter collecting dust in an air flow has a principal collection layer including a porous polytetrafluoroethylene film. A surface of the filter medium is provided with a plurality of embossed projections. Preferably, a processed filter medium maintains a zigzag shape by pleating an unprocessed filter medium to create mountain folds and valley folds. Preferably, an air filter unit includes such a processed filter medium and a frame body holding the processed filter medium.

13 Claims, 4 Drawing Sheets

(51) Int. Cl.
*B01D 46/54* (2006.01)
*B32B 5/02* (2006.01)
*B32B 5/26* (2006.01)
*B32B 7/12* (2006.01)

(52) U.S. Cl.
CPC *B32B 2262/0253* (2013.01); *B32B 2262/0261* (2013.01); *B32B 2262/0284* (2013.01); *B32B 2262/0292* (2013.01); *B32B 2307/724* (2013.01)

(56) References Cited

U.S. PATENT DOCUMENTS

| | | | |
|---|---|---|---|
| 2011/0016838 A1* | 1/2011 | Smithies et al. | 55/521 |
| 2011/0314782 A1* | 12/2011 | Morita et al. | 55/500 |
| 2012/0186452 A1* | 7/2012 | Smithies et al. | 96/9 |
| 2014/0033665 A1* | 2/2014 | Smithies et al. | 55/486 |

FOREIGN PATENT DOCUMENTS

| | | |
|---|---|---|
| JP | 2-284614 A | 11/1990 |
| JP | 2000-300921 A | 10/2000 |
| JP | 2002-370009 A | 12/2003 |
| JP | 2005-279554 A | 10/2005 |
| JP | 2006-150275 A | 6/2006 |
| JP | 2009-501438 A | 1/2009 |
| JP | 2011-25238 A | 2/2011 |

OTHER PUBLICATIONS

International Search Report of corresponding PCT Application No. PCT/JP2012/005497.

European Search Report of corresponding EP Application No. 12 82 8264.7 dated Jul. 14, 2015.

* cited by examiner

FILTER MEDIUM FOR AIR FILTER AND FILTER UNIT

CROSS-REFERENCE TO RELATED APPLICATIONS

This U.S. National stage application claims priority under 35 U.S.C. §119(a) to Japanese Patent Application No. 2011-190200, filed in Japan on Aug. 31, 2011, the entire contents of which are hereby incorporated herein by reference.

TECHNICAL FIELD

The present invention relates to a filter medium for an air filter, and an air filter unit for collecting dust in an air flow.

BACKGROUND ART

A semiconductor device or a liquid crystal display has been conventionally manufactured in high clean space. To produce such high clean space, a porous film (which will be hereinafter referred to as a porous PTFE film) made of polytetrafluoroethylene (which will be hereinafter referred to as PTFE) is used as a dust collecting filter. A porous PTFE film, which has high dust collection efficiency compared with a filter medium made of glass fiber at the same pressure loss, is favorably used especially for a HEPA filter (High Efficiency Particulate Air Filter) or a ULPA filter (Ultra Low Penetration Air Filter).

On the other hand, clogging due to dust occurs frequently in a porous PTFE film, which has a fiber structure denser than that of a glass fiber filter medium that has been used conventionally, and pressure loss of an air filter unit increases in a short time when the air filter unit is used in an environment, which gives a heavy dust load, such as an outside air processing unit.

With regard to the above problem, a filter medium for an air filter is known, which can prevent clogging due to collected dust and suppress a rise in pressure loss JP 2000-300921 A. The filter medium for an air filter includes a porous PTFE film and an air-permeable porous material made of fiber, and the air-permeable porous material made of fiber is located at an upstream side of the porous film in an air flow. The air-permeable porous material made of fiber has a fiber diameter within the range of 1 to 15 μm, porosity more than or equal to 70%, and basis weight more than or equal to 60 g/m$^2$.

An air intake fitter medium for a turbine is also known, which is a filter medium for a filter wherein a rise in pressure loss is suppressed JP 2002-370009 A. The filter medium includes a porous polytetrafluoroethylene film and an air-permeable support member. Used for the air-permeable support member is fiber having a wide range of a fiber diameter of 0.2 to 15 μm, inclusive.

SUMMARY

Technical Problem

These filter mediums are formed in a zigzag shape by applying pleating to fold a filter medium so as to create mountain folds and valley folds in order to integrate the filter medium into an air filter unit. A filter medium which maintains a zigzag shape is prepared by inserting a separator or a spacer into a concave part of a filter medium having a zigzag shape, and an air filter unit is formed by holding the filter medium in a frame body.

By providing a separator or a spacer in a concave part of a filter medium in order to maintain a zigzag shape of the filter medium, however, the weight of an air filter unit increases, and the effective filtration area of the filter medium becomes smaller, causing an increase in pressure loss at the air filter unit.

Accordingly, an object of the present invention is to provide a filter medium for an air filter, which can suppress pressure loss at an air filter unit without causing an increase in weight of the air filter unit, and an air filter unit provided with the filter medium.

Solution to Problem

It has been conventionally considered that a filter medium for an air filter, which has a porous PTFE film that breaks easily, becomes unusable as a filter medium after processing such as embossing is applied. In contrast, the present inventors have found regarding a filter medium for an air filter having a porous PTFE film that the filter medium for an air filter or the porous PTFE film does not break and remains usable as a filter medium for an air filter even after an embossed projection is provided by embossing, and have reached the present invention. Specifically, an aspect of the present invention is a filter medium for an air filter for collecting dust in an air flow. The filter medium for an air filter includes a principal collection layer including a porous polytetrafluoroethylene film, and a surface of the filter medium for an air filter is provided with a plurality of embossed projections.

Another aspect of the present invention is an air filter unit. The air filter unit includes a processed filter medium having a zigzag shape obtained by pleating the filter medium for an air filter and a frame body for holding the processed filter medium.

Each of the embossed projections of the filter medium for an air filter comes into contact with one of embossed projections provided on a facing surface of the filter medium for an air filter, to maintain the zigzag shape.

Advantageous Effect of Invention

With the filter medium for an air filter and the air filter unit provided with the filter medium, it is possible to suppress pressure loss at an air filter unit without increasing weight of the air filter unit. In such a case, it is possible to maintain dust collection efficiency as a filter similar to that of a conventional filter.

DESCRIPTION OF EMBODIMENT

The following description will give detailed explanation on a filter medium for an air filter of the present invention and an air filter unit provided with the filter medium.

[Air Filter Unit]

Figure 1:
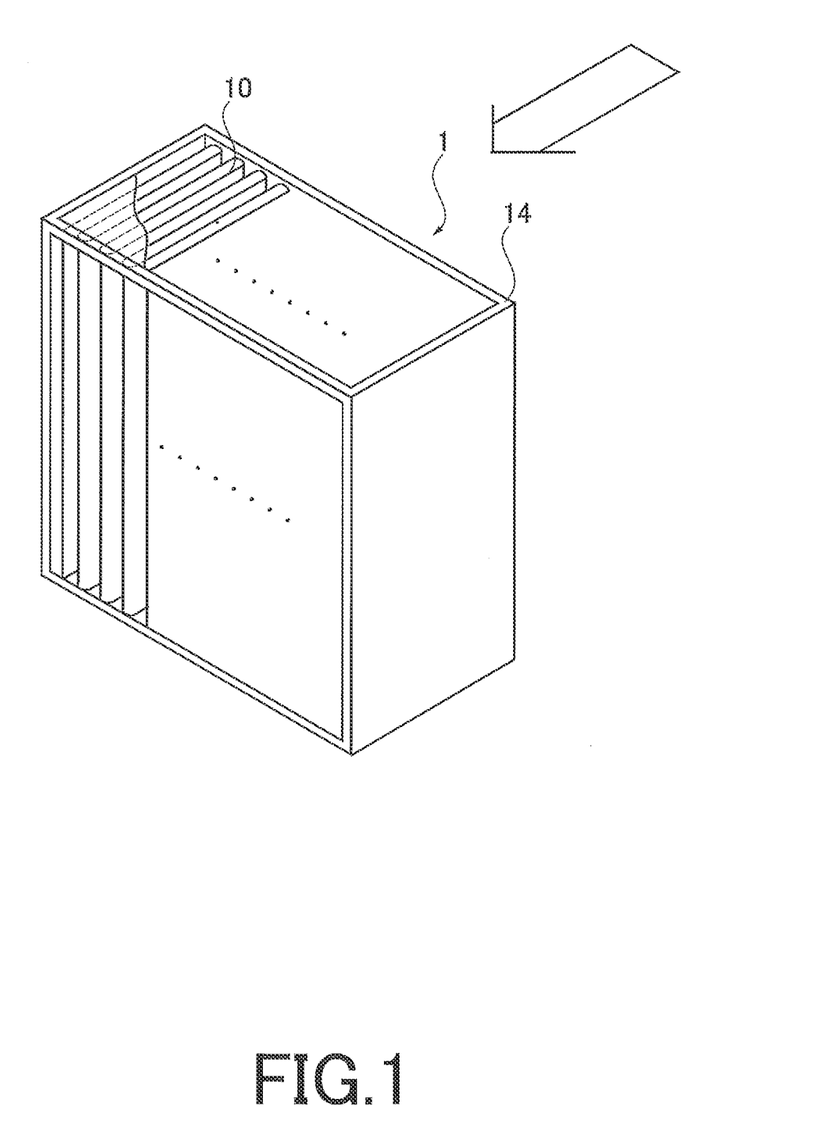
FIG. 1 is a perspective outside view of an air filter unit which is provided with a filter medium for an air filter of the present embodiment.

FIG. 1 is a perspective outside view of an air filter unit 1 which is provided with a filter medium for an air filter of the present embodiment. As illustrated in FIG. 1, the air filter unit 1 has a filter medium for an air filter (which will be hereinafter referred to simply as a filter medium) 10 and a frame body 14. The filter medium 10 is formed in a zigzag shape by folding so as to create mountain folds and valley folds at equal intervals, and is held in the frame body 14 with the shape maintained.

[Shape of Filter Medium]

Figure 2A:
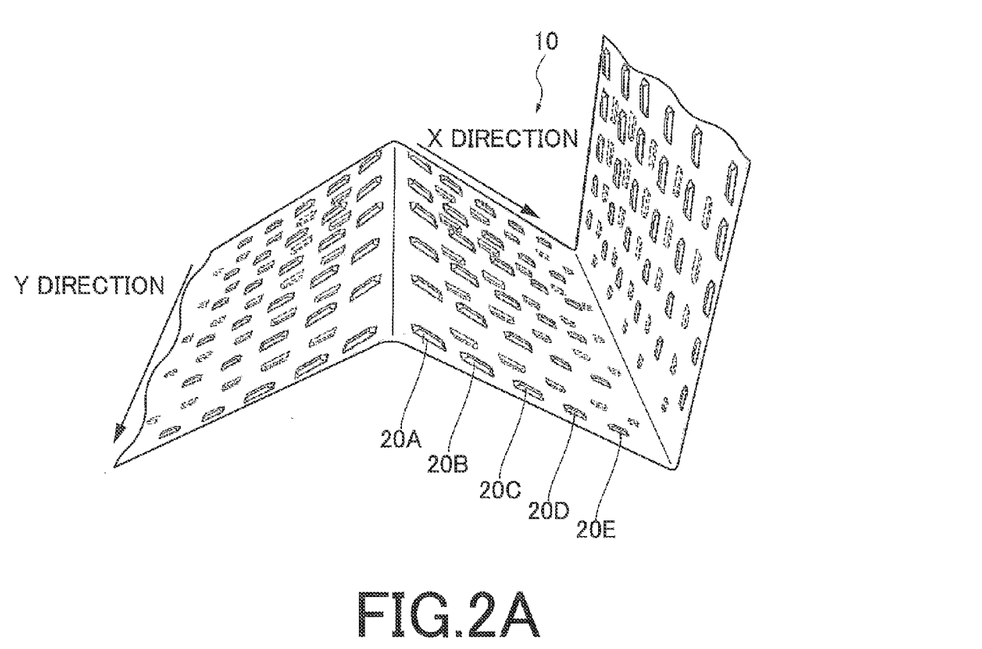
FIGS. 2A and 2B are perspective outside views of the filter medium of the present embodiment.
Figure 2B:
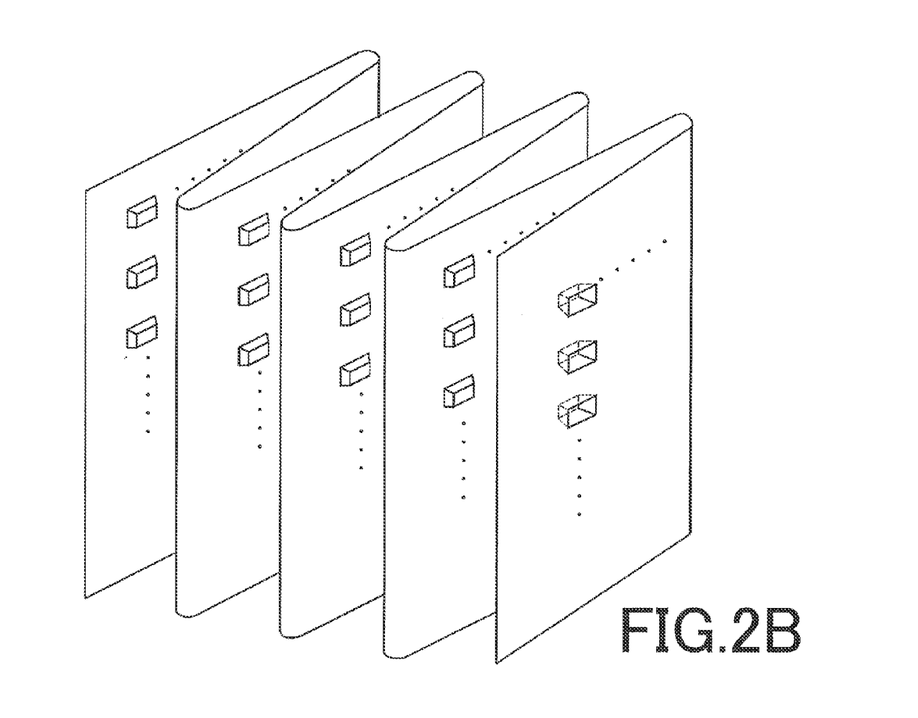
Figure 3:
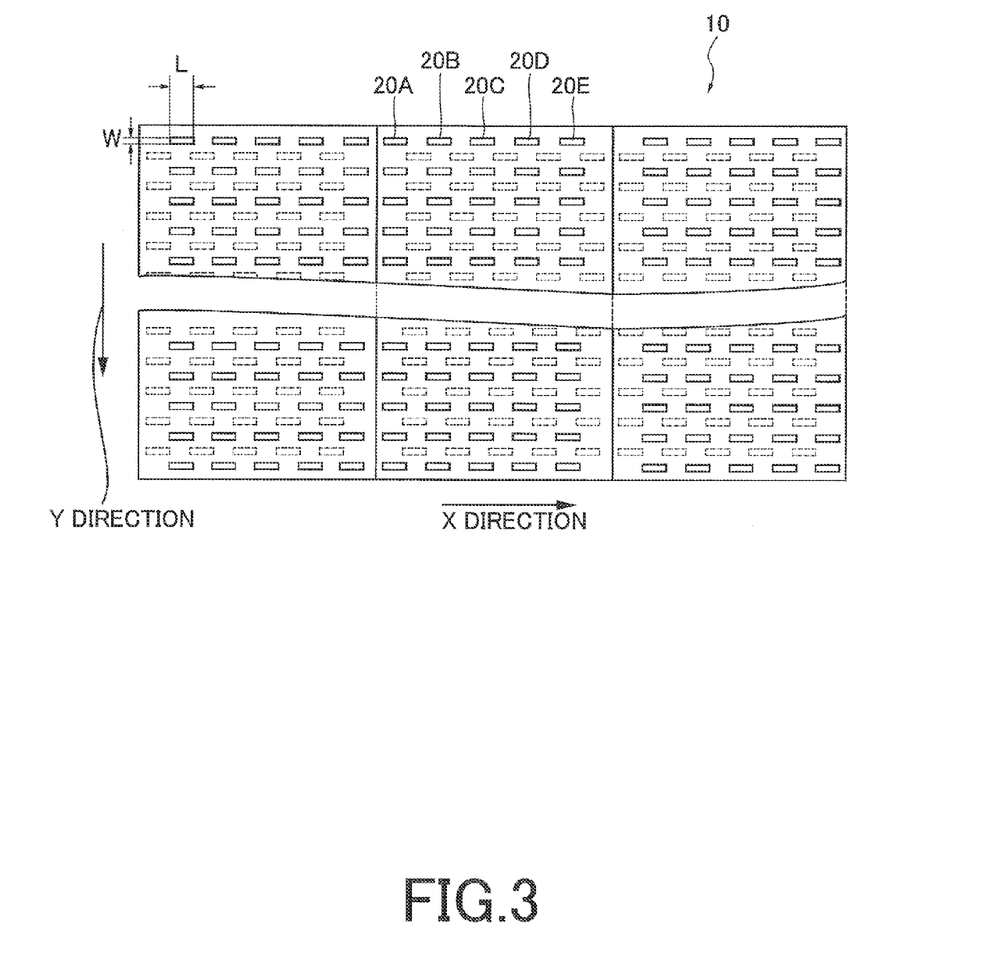
FIG. 3 is a development elevation of the filter medium of the present embodiment.

FIGS. 2A and 2B are perspective outside views of the filter medium 10. FIG. 3 is a development elevation of the filter medium 10.

The filter medium 10 illustrated in FIGS. 2A and 2B is provided with embossed projections 20A to 20E in a dot pattern on the front and back surfaces of the filter medium 10. The filter medium 10 is folded so as to create mountain folds and valley folds mutually, and is designed to make embossed projections on surfaces, which face each other when the filter medium 10 is folded, into contact with each other and maintain the interval between opposed surfaces of the filter medium.

The embossed projections 20A to 20E are formed on both side surfaces so as to maintain the interval between surfaces, which become adjacent to each other when the filter medium 10 is folded so as to create mountain folds and valley folds, of the filter medium 10. The embossed projections 20A to 20E in a dot pattern can be formed in various three-dimensional shapes. Here, an embossed projection which is projected to the front side from one surface of the filter medium 10 is referred to as a convex projection, and an embossed projection which is projected to the opposite side is referred to as a concave projection. That is, a concave projection viewed from one surface of the filter medium 10 becomes a convex projection when viewed from the other surface.

When convex projections of the embossed projections 20A to 20E are viewed from an upper side in a direction perpendicular to the surface of the filter medium 10, a width W (a width in the Y direction) and a length L (a length in the X direction) of the embossed projections 20A to 20E are defined as illustrated in FIG. 3 with respect to a contour shape of an edge part of a rising part of the convex projection. In addition, when a virtual plane parallel to a plane of the filter medium 10 comes into contact with the highest part of a convex projection, an interval between the virtual plane and a surface of the filter medium 10 is defined as a projection height H of an embossed projection 20A to 20E, and a plane, which includes the point to come into contact with the virtual plane, is defined as a top surface.

A projection shape of the embossed projections 20A to 20E can be selected from a variety of shapes such as a rectangular parallelepiped, a cube, a prism, a column, a hemisphere, a spherical zone, a truncated pyramid, a cone, a pyramid and a truncated cone, for example. In addition, projection shapes of embossed projections 20A to 20E on surfaces, which face each other, of the filter medium 10 do not need to be symmetrical to each other. For example, a convex part and a concave part may be further formed on a top surface of the respective embossed projections 20A to 20E, so that the embossed projections 20A to 20E are locked with each other by the convex part and the concave part when embossed projections 20A to 20E on surfaces, which face each other, of the filter medium 10 come into contact with each other. Since the embossed projections 20A to 20E are locked with each other by the concave part and the convex part, relative misalignment of embossed projections 20A to 20E, which come into contact with each other, rarely occurs. It is therefore possible to maintain a zigzag shape of the filter medium 10 more firmly. A top surface of the embossed projections 20A to 20E may be a flat plane having a rectangular shape such as a rectangle or a square, or may be a curved surface having curvature, such as a hemisphere or a column.

A plurality of the embossed projections 20A to 20E are arranged in the X direction (see FIG. 2A) which is a direction from a summit of a mountain fold of the filter medium 10 to a valley floor of a valley fold. Since projection height of the respective embossed projections 20A to 20E becomes gradually smaller from a summit of a mountain fold to a valley floor of a valley fold, it is possible to maintain the shape of a concave part as a V shape or a U shape which can reduce pressure loss at the air filter unit. That is, the largest projection position of the embossed projections 20A to 20E is a position closest to a summit of a mountain fold, and the smallest projection position of the embossed projections 20A to 20E is a position closest to a valley floor of a valley fold.

Here, the largest projection height of projection heights H of the embossed projections 20A to 20E, not including the thickness of the filter medium 10, is preferably 2 to 6 mm. From the largest projection height, projection height H of the embossed projections 20A to 20E becomes smaller along the X direction. When the projection height H of the largest projection position among projection heights H is larger than 6 mm, the interval between summits of adjacent mountain folds of the filter medium 10 may possibly be large, the dust collection efficiency may possibly be low, and the filter medium 10, which is provided with a porous PTFE film that will be described later, may possibly be stretched locally by embossing, causing breakage of the filter medium 10. In addition, the projection height H of the smallest projection position among projection heights H is set within a range which can prevent surfaces that face each other of the filter medium 10 from coming into contact with each other and maintain a space sandwiched by the filter medium 10.

A plurality of the embossed projections 20A to 20E are arranged in the Y direction (see FIG. 2A) perpendicular to a direction from a summit of a mountain fold of the filter medium 10 to a valley floor of a valley fold. Since embossed projections in each line have a certain height, it is possible to maintain a certain shape of the filter medium 10.

A width W of the embossed projections 20A to 20E is preferably 1.0 to 10 mm, and further preferably 2.0 to 9.0 mm. When the width W is larger than 10 mm, the structural resistance of an air flow may possibly increase and the pressure loss at the air filter unit may possibly increase. When the width W is smaller than 1.0 mm, relative misalignment of embossed projections 20A to 20E sometimes occurs when the filter medium 10 is folded so as to create mountain folds and valley folds mutually and makes it impossible to maintain a zigzag shape of the filter medium 10, and this sometimes cause an increase in pressure loss at the air filter unit 1.

A length L of the embossed projections is preferably 1.0 to 20 mm, and more preferably 3.0 to 18 mm. When the length L is larger than 20 mm, a filter medium effective area of the filter medium 10 may possibly decrease, causing an increase in pressure loss. When the length L is smaller than 1.0 mm, relative misalignment of embossed projections 20A to 20E sometimes occurs when the filter medium 10 is folded so as to create mountain folds and valley folds mutually and makes it impossible to maintain a zigzag shape of the filter medium 10, and this sometimes cause an increase in pressure loss at the air filter unit 1.

Regarding the shape of the embossed projections 20A to 20E, the ratio of the width W to the length L (length/width), i.e. an aspect ratio, is preferably 0.5 to 3, and more preferably 1 to 2. When the aspect ratio is smaller than 0.5, relative misalignment of embossed projections 20A to 20E provided on surfaces, which face each other, of the filter medium 10 sometimes occurs when the filter medium 10 is folded so as to create mountain folds and valley folds mutually and makes it impossible to maintain the shape. When the aspect ratio is larger than 3, a filter medium effective area of the filter medium 10 sometimes decreases, causing an increase in pressure loss.

In addition, the width W and the length L of a plurality of the embossed projections 20A to 20E arranged in the Y direction (see FIG. 2A) of the filter medium 10 preferably become larger continuously or in stages from a valley floor of a valley fold to a summit of a mountain fold. When embossed projections 20A to 20E having large heights are formed, embossed projections 20A to 20E having a small width W and a small length L receive large force per unit area of the filter medium 10 from embossing, and this sometimes causes breakage of the filter medium 10. It is possible to prevent breakage of the filter medium 10 when a width W and a length L of embossed projections 20A to 20E having large projection heights H are set large.

Regarding the embossed projections 20A to 20E, an angle formed by a plane of the filter medium 10 and a straight line connecting a point, which is at a side closest to a summit of a mountain fold, of a contour line of an edge part rising from a plane of the filter medium 10 of the embossing projections 20A to 20E with the highest point of the embossed projections 20A to 20E is defined as a rising angle. It is to be noted that the highest point is a point closest to a summit of a mountain fold in a top surface when the top surface of the embossed projections 20A to 20E is a plane.

Here, a proper rising angle of the embossed projections 20A to 20E varies according to the projection height H. When the projection height H of the embossed projections 20A to 20E is more than or equal to 2.0 mm, for example, a rising angle is preferably 30 to 90°, and more preferably 30 to 60°. When a rising angle exceeds 90°, a load of deformation to the filter medium 10 becomes extremely large. When a rising angle is smaller than 30°, the area of a top surface of the embossed projections 20A to 20E becomes small. When the projection height H of the embossed projections 20A to 20E is smaller than 2.0 mm, a rising angle is preferably less than or equal to 90°, and more preferably less than or equal to 60°.

The number of embossed projections 20A to 20E included in a line extending in the X direction or the Y direction in FIG. 2A is preferably 3 to 15, inclusive, and more preferably 5 to 10, inclusive. When the number is smaller than 3, it sometimes becomes difficult to maintain an interval between summits of mountain folds, and embossed projections 20A to 20E in an air flow sometimes come into contact with a part other than the embossed projections 20A to 20E, which are provided at an opposite surface of the filter medium 10, and this sometimes leads to an increase in pressure loss. On the other hand, when the number is larger than 16, a filter medium effective area through which an air flow passes becomes small, and this leads to an increase in pressure loss.

The interval between embossed projections 20A to 20E in the X direction is preferably 5 to 25 mm, and more preferably 7 to 20 mm. When the interval is smaller than 5 mm, relative misalignment of embossed projections 20A to 20E of the folded filter medium 10 sometimes occurs, and this makes it impossible to maintain the shape. When the interval is larger than 25 mm, swelling sometimes occurs at the filter medium 10 in an air flow, and adjoining surfaces of the filter medium 10 sometimes come into contact with each other. This sometimes causes an increase in pressure loss at the air filter unit 1.

The interval between embossed projections 20A to 20E in the Y direction is preferably 15 to 60 mm. A concave projection of the embossed projections 20A to 20E is provided between adjoining convex projections of the embossed projections 20A to 20E, and a line of concave projections of the embossed projections 20A to 20E is preferably formed between two adjoining lines of convex projections of the embossed projections 20A to 20E. When convex projections of the embossed projections 20A to 20E and concave projections of the embossed projections 20A to 20E are arranged unevenly, an air flow at the air filter unit 1 sometimes becomes uneven, and this sometimes causes an increase in pressure loss at the air filter unit 1.

The ratio of the depth dimension of the zigzag shape of the filter medium 10 (a length in the X direction from a summit of a mountain fold to a valley floor of a valley fold: a folding width) to the interval between summits of mountains folds (or valley floors of valley folds) in the filter medium 10 maintained in a zigzag shape by the embossed projections 20A to 20E, not including the thickness of the filter medium 10, is preferably 21 to 65, inclusive.

When the depth dimension (a folding width) of the filter medium 10 is 260 mm (the thickness of the filter medium 10 is 0.65 mm), for example, and the interval between summits or valley floors of the filter medium 10 is 4.0 to 12.0 mm, inclusive, for example, the ratio is from 21.6 (=(260−2×0.65)/12.0) to 64.7 (=(260−2×0.65)/4.0), inclusive.

In addition, when the depth dimension (a folding width) of the filter medium 10 is 125 mm (the thickness of the filter medium 10 is 0.65 mm) and the interval between summits or valley floors of the filter medium 10 is 4.7, for example, the ratio becomes 26.3 (=(125−2×0.65)/4.7).

The folding width of the filter medium 10 is preferably 30 to 280 mm. In general, the filter medium 10 has many mountain folds and valley folds from a point of view of the life of the air filter unit 1, though it is difficult to provide a sufficient interval between summits of adjacent mountain folds when the folding width is smaller than 30 mm. On the other hand, when the folding width exceeds 280 mm, it is necessary to set the interval between adjacent mountain folds to be large so as to prevent parts of planes, which face each other, of the filter medium 10 from coming into contact with each other. For this purpose, it is necessary to set the height of embossed projections to be large. Therefore, the embossed projections 20A to 20E sometimes cause breakage of the filter medium 10.

The ratio of the occupied area of the embossed projections 20A to 20E formed at the filter medium 10 is preferably lower than 20% of the area of a surface of the filter medium 10. When the ratio is more than or equal to 20%, the effective filtration area of the filter medium 10 is small, and this tends to cause an increase in pressure loss and lowering of dust collection efficiency.

The air filter unit 1 can be used properly for an HEPA filter or a ULPA filter.

The above description has given explanation on the shape of the filter medium 10. Next, the layer structure of the filter medium 10 to be used in the present embodiment will be explained.

[Layer Structure of Filter Medium]

Figure 4:
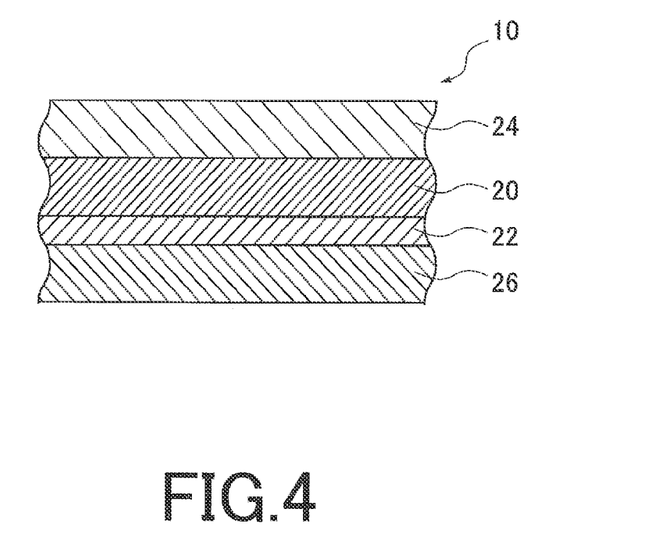
FIG. 4 is a sectional view for illustrating the layer structure of the filter medium of the present embodiment.

FIG. 4 is a sectional view for illustrating the layer structure of the filter medium 10 to be used in the air filter unit 1. The filter medium 10 is a filter medium for an air filter for collecting dust in an air flow, and includes a pre-collection layer 20, a principal collection layer 22, an air-permeable cover layer 24 and an air-permeable support layer 26. It is to be noted that the filter medium 10 is located in such a manner that air flows from an upper side to a lower side in FIG. 4. Consequently, the air-permeable cover layer 24, the pre-collection layer 20, the principal collection layer 22 and the air-permeable support layer 26 are laminated in this order from the upstream side of an air flow.

The pre-collection layer 20 is provided at an upstream side of an air flow of the principal collection layer 22, and collects a part of dust in an air flow before dust collection by the principal collection layer 22. A nonwoven fabric made of a fiber material, the fabric manufactured by a melt blowing method or an electrospinning method, for example, is used for the pre-collection layer 20. The mean fiber diameter of the fiber material is preferably more than or equal to 0.8 µm and smaller than 2 µm. Here, regarding distribution of fiber diameters to be measured as described later, the geometric standard deviation of the nonwoven fabric, which expresses spreading of fiber diameter distribution, is less than or equal to 2.5, for example, and preferably less than or equal to 2.0. This is because, when the geometric standard deviation is too large, the ratio of fiber having low collection efficiency per unit fiber increases and it becomes necessary to set the basis weight and the thickness to be large so as to obtain necessary collection efficiency of a pre-collection layer which will be described later.

Examples of the material of a fiber material of the pre-collection layer 20 are polyethylene (PE), polypropylene (PP), polyethylene-terephthalate (PET), polybutylene-terephthalate (PBT), polyamide (PA), polyacrylonitrile (PAN), polyvinylidene fluoride (PVdF), polyvinyl alcohol (PVA) and polyurethane (PU). When the mean fiber diameter of the nonwoven fabric of the pre-collection layer 20 is smaller than 0.8 µm, fabric arrangement becomes dense and therefore pressure loss rises significantly, though the dust collection efficiency rises. On the other hand, when the mean fiber diameter is more than or equal to 2 µm, the basis weight is set large so as to maintain the dust collection efficiency, and this causes an increase in thickness of the pre-collection layer. Therefore, the pressure loss at the filter medium rises. From the above reasons, the mean fiber diameter of the fiber material at the pre-collection layer 20 is preferably more than or equal to 0.8 µm and smaller than 2 µm.

The pressure loss of the pre-collection layer 20 is preferably less than or equal to 80 Pa. In addition, in order to keep the pressure loss of the whole filter medium at approximately ½ of that of a filter medium for a HEPA provided with glass fiber, the dust collection efficiency of the pre-collection layer 20 is preferably more than or equal to 50%, and the upper limit of the collection efficiency of the pre-collection layer 20 is preferably 99%. When the collection efficiency of the pre-collection layer 20 is too low, a collection load to the principal collection layer 22 increases and clogging due to dust occurs. When the collection efficiency of the pre-collection layer 20 is too high, clogging at the pre-collection layer 20 itself becomes unignorable. In addition, the thickness of the pre-collection layer 20 is preferably smaller than 0.3 mm, for example. When the thickness of the pre-collection layer 20 is more than or equal to 0.3 mm, the pressure loss (structural resistance) due to the structure of an air filter unit 1 becomes large. The material of the fiber material of the pre-collection layer 20 and the basis weight are selected so as to obtain such characteristics.

The principal collection layer 22 is located at a downstream side of an air flow of the pre-collection layer 20, and collects dust which has passed through the pre-collection layer 20. The principal collection layer 22 is made of a porous PTFE film.

The porous PTFE film is prepared from a mixture of PTFE fine powder and a liquid lubricant at a predetermined ratio or more. For example, a mixture is obtained by mixing a liquid lubricant into PTFE fine powder, in an amount of 5 to 50 mass % at 20° C. per 1 kg of PTFE fine powder. Furthermore, the obtained mixture is rolled and then the liquid lubricant is removed so as to obtain an unbaked tape. Furthermore, the obtained unbaked tape is stretched so as to obtain a porous film. Here, the unbaked tape is stretched at a total area magnification of 80 to 800 times, inclusive, by stretching the unbaked tape so as to have a length of 3 to 20 times, inclusive, in the longitudinal direction and then stretching the unbaked tape so as to have a width of 10 to 50 times, inclusive, in the width direction. The porous PTFE film is obtained in such a manner. The manufacturing method is an example, and a manufacturing method of the porous PTFE film is not limited. The filling rate of the porous PTFE film is less than or equal to 8%, for example, and preferably 3 to 8%, inclusive. The mean fiber diameter of fiber which constitutes the porous PTFE film is less than or equal to 0.1 µm, for example. The thickness of the porous PTFE film is less than or equal to 50 µm, for example.

The air-permeable cover layer 24 is located at a position of the outermost layer of the filter medium 10 at an upstream side of an air flow, allows dust in an air flow to pass, and suppresses deformation of the surface of the filter medium 10 by pressing force from outside. A spunbond nonwoven fabric provided with a fiber material of PP, for example, is used for the air-permeable cover layer 24. The present invention does not need to use the air-permeable cover layer 24. However, it is preferable to provide the air-permeable cover layer 24 from a point of view to prevent an increase in pressure loss at an air filter unit in case the filter medium 10 receives pressing force from outside. When the filter medium 10 receives pressing force from outside, the pre-collection layer 20 tends to deform, and deformation of the pre-collection layer 20 gives excess resistance to an air flow in the filter medium 10. The resistance becomes structural resistance at the air filter unit 1 and causes an increase in pressure loss. However, when the air-permeable cover layer 24 for suppressing deformation of the surface of the filter medium 10 by pressing force from outside is provided at a position of the outermost layer at an upstream side of an air flow, the air-permeable cover layer 24 suppresses deformation of the surface of the filter medium 10 and does not give excess resistance to an air flow.

It is preferable that the pressure loss of the air-permeable cover layer 24 is less than or equal to 10 Pa at a condition that the flow velocity of an air flow is 5.3 cm/sec from a point of view to suppress the pressure loss of the filter medium 10, and it is more preferable that the pressure loss is less than or equal to 5 Pa and is substantially 0 or approximately 0. The collection efficiency of dust with a particle diameter of 0.3 µm of the air-permeable cover layer 24 is less than or equal to 5% and is substantially 0 or approximately 0. That is, the air-permeable cover layer 24 does not have a function as a filter for collecting dust and allows dust to pass. It is preferable that the thickness of such an air-permeable cover layer 24 is less than or equal to 0.3 mm from a point of view to prevent the thickness of the filter medium 10 from becoming excessively large and suppress deformation of the surface of the filter medium 10.

A spunbond nonwoven fabric, for example, is used properly for the air-permeable cover layer 24. PP, PE, PET or the like, for example, is used for the fiber material of the spunbond nonwoven fabric, and the fiber material is not especially limited. The mean fiber diameter of the fiber material is 10 to 30 µm, for example. The basis weight is 5 to 20 g/m$^2$, for example.

The air-permeable support layer 26 is located at a downstream side of an air flow of the principal collection layer 22, and supports the principal collection layer 24. It is preferable that the pressure loss of the air-permeable support layer 26 is less than or equal to 10 Pa at a condition that the flow velocity of an air flow is 5.3 cm/sec from a point of view to suppress the pressure loss of the filter medium 10, and it is preferable that the pressure loss is substantially 0 or approximately 0. The collection efficiency of dust with a particle diameter of 0.3 μm at the air-permeable support layer 26 is substantially 0 or approximately 0.

The material and the structure of the air-permeable support layer 26 are not especially limited, though felt, a nonwoven fabric, a woven fabric, mesh (a reticulate sheet) or other materials can be used, for example. It is to be noted that a nonwoven fabric having excellent thermal fusibility is preferable from a point of view of strength, collection ability, flexibility and usability. Furthermore, a nonwoven fabric may be mixed fiber made of fiber, a part or whole of which has a core-sheath structure. In such a case, a core component preferably has a melting point higher than that of the sheath component. The material of the fiber material is also not especially limited, though polyolefin (such as PE, PP), polyamide, polyester (such as PET), aromatic polyamide, a composite material thereof or the like can be used. In the case of mixed fiber having a core-sheath structure, examples of a combination of core/sheath are polyester/polyethylene or high melting point polyester/low melting point polyester.

In addition, regarding a laminate of the principal collection layer 22 and the air-permeable support layer 26, it is preferable that the flexural rigidity is more than or equal to 30 gf/mm from a point of view to suppress deformation of the principal collection layer 22 due to an air flow with the air-permeable support layer 26. The principal collection layer 22, which has a large pressure loss and an extremely small thickness and low rigidity, tends to be deformed by an air flow. When the air-permeable support layer 22 does not exist, stress of the principal collection layer 22 to deform and distortion thereof act between the principal collection layer 22 and the pre-collection layer 20, and sometimes finally causes interlaminar fracture of the pre-collection layer 20. Therefore, the flexural rigidity at a laminate of the principal collection layer 22 and the air-permeable support layer 26 is preferably more than or equal to 30 gf/mm. The upper limit of flexural rigidity of a laminate of the principal collection layer 22 and the air-permeable support layer 26 is not especially limited, though it is preferable that the flexural rigidity is substantially less than or equal to 2,000 gf/mm.

Regarding the above filter medium 10, when the flow velocity of an air flow is 5.3 cm/second, the principal collection layer 22 has the largest pressure loss among the air-permeable cover layer 24, the pre-collection layer 20 and the principal collection layer 22, and the pre-collection layer 20 has the second largest pressure loss, and the air-permeable cover layer 24 has the smallest pressure loss. It is preferable that the pressure loss of the air-permeable cover layer 24 is less than or equal to 10 Pa, the pressure loss of the pre-collection layer 20 is less than or equal to 80 Pa, and the pressure loss of the principal collection layer 22 is less than or equal to 100 Pa from a point of view to set the pressure loss at the filter medium 10 to be less than or equal to 190 Pa. With the pressure loss within such a range, the filter unit 15 can be used properly for a HEPA filter or a ULPA filter.

Regarding collection efficiency of dust with a particle diameter of 0.3 μm, the principal collection layer 22 has the largest collection efficiency among the air-permeable cover layer 24, the pre-collection layer 20 and the principal collection layer 22, and the pre-collection layer 20 has the second largest collection efficiency. The collection efficiency of the air-permeable cover layer 24 is less than or equal to 0.5% and is substantially 0 or approximately 0. It is preferable that the collection efficiency of dust with a particle diameter of 0.3 μm at the pre-collection layer 20 is more than or equal to 50% in a state where the pre-collection layer 20 is destaticized and the collection efficiency of dust with a particle diameter of 0.3 μm at the principal collection layer 22 is more than or equal to 99.9% from a point of view to set the collection efficiency of dust with a particle diameter of 0.3 μm at the filter medium 10 to be more than or equal to 99.97%. With the pressure loss within such a range, the air filter unit 15 can be used properly for a HEPA filter.

It is to be noted that the air-permeable cover layer 24 and the pre-collection layer 20 can be joined with each other by using, for example, ultrasonic thermal fusion, adhesion with reactive adhesive, heat lamination with a hot melt resin, or the like.

The principal collection layer 22 and the air-permeable support layer 26 can be joined with each other by melting of a part of the air-permeable support layer 26, by melting of hot melt resin, by utilizing an anchor effect, or by utilizing adhesion of reactive adhesive or the like.

Moreover, the pre-collection layer 20 and the principal collection layer 22 can be joined with each other by using, for example, heat lamination with hot melt resin or by utilizing adhesion of reactive adhesive or the like.

Modified Embodiment

Figure 5:
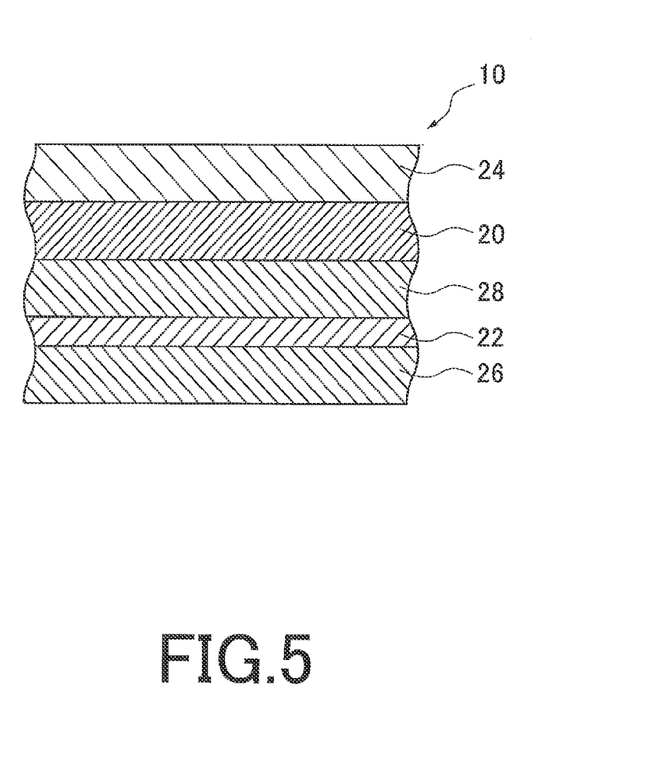
FIG. 5 is a sectional view for illustrating the layer structure of the filter medium of a modified example.

As illustrated in FIG. 4, the filter medium 10 of the present embodiment is provided with the air-permeable support layer 26 at a downstream side of an air flow of the principal collection layer 22. As illustrated in FIG. 5, the filter medium 10 of the present modified embodiment is provided with an air-permeable support layer 26 at a downstream side of an air flow of the principal collection layer 22 and also an air-permeable support layer 28 at an upstream side of an air flow of the principal collection layer 22. That is, regarding the filter medium 10 of the present modified embodiment, the air-permeable cover layer 24, the pre-collection layer 20, the air-permeable support layer 28, the principal collection layer 22 and the air-permeable support layer 26 are laminated in this order from an upstream side of an air flow. The air-permeable support layer 28 may have a structure similar to that of the air-permeable support layer 26, or may have a different structure. The pressure loss of the air-permeable support layer 28 is less than or equal to 10 Pa at a condition that the flow velocity of an air flow is 5.3 cm/second or is substantially almost 0. In addition, the collection efficiency of dust with a particle diameter of 0.3 μm of the air-permeable cover layer 28 is substantially 0 or approximately 0. With such conditions met, the material and the structure of the air-permeable support layer 28 are not especially limited. Regarding the filter medium 10 having a layer structure of the present modified embodiment, the air-permeable support layer 28 and the air-permeable support layer 26 are joined with the principal collection layer 22 so as to sandwich the principal collection layer 22 from both sides of the principal collection layer 22.

By providing the air-permeable support layer 28, it becomes possible to support the principal collection layer 22 more reliably than the filter medium 10 having a layer structure illustrated in FIG. 4 and suppress interlaminar fracture between the principal collection layer 22 and the pre-collection layer 20 more reliably. In addition, it is possible to prepare the filter medium 10 by accurate lamination of the principal collection layer 22, which has extremely low rigidity.

In the present embodiment wherein the filter medium 10 having a porous PTFE film is provided with a plurality of embossed projections 20A to 20E, the shape of the pleated filter medium 10 is maintained, and therefore weight increase as in a conventional air filter unit provided with a separator or a spacer is prevented and an effective filtration area can be enlarged. Accordingly, it is possible to suppress the pressure loss at an air filter unit without sacrificing dust collection efficiency. Since a porous PTFE film to be used in the principal collection layer 22 has a thickness exceedingly smaller than that of other layers, it has been thought that processing to set the projection height H to be more than or equal to 2.0 mm causes breakage of the porous PTFE film. It is, however, possible to project the filter medium 10 having a porous PTFE film by embossing so as to have a projection height H similar to that of a separator or a spacer to be used for maintaining the shape of a filter medium. Moreover, it is possible to suppress the pressure loss at the air filter unit 1 without causing breakage of the filter medium 10.

[Characteristics of Filter Medium and Air Filter Unit]

(Pressure Loss of Filter Medium)

A circular test sample having an effective area of 100 cm² was taken out of the filter medium 10 and was set in a cylindrical filter medium holder. An air flow was adjusted to set the filter medium permeation speed of air at 5.3 cm/second, a pressure was measured at an upstream side and a downstream side of the test sample using a manometer, and a difference between pressures at upstream and downstream sides was obtained as a pressure loss of the filter medium 10.

(Collection Efficiency of Filter Medium)

A test sample similar to the test sample used for a pressure loss of the filter medium 10 was set in a filter medium holder. An air flow was adjusted so as to set the filter medium passing speed of air at 5.3 cm/second, PSL (Polystyrene Latex) particles with a diameter of 0.3 µm were introduced to an upstream side of the air flow, and the concentration of the PSL particles was measured at an upstream side and a downstream side of the test sample using a light-scattering particle counter. The collection efficiency of the filter medium 10 was obtained according to the following expression.

Collection efficiency(%)=[1−(concentration of PSL particles at downstream side/concentration of PSL particles at upstream side)]×100

In order to eliminate the influence of collection efficiency rise due to electrification of the test sample on the collection efficiency of the pre-collection layer 20, the test sample was exposed to IPA (Isopropyl Alcohol) vapor for one day to make a destaticized state.

(Thickness)

A dial thickness gauge was used and a value of thickness was read in a state where a load of 2.5 N was applied to the test sample per 10 mmφ.

(Mean Fiber Diameter)

An image of the surface of the test sample was captured with a scanning electron microscope (SEM) at a magnification of 1,000 to 5,000. Two lines perpendicular to each other were drawn on one captured image, and the width of an image of fiber which crosses with the lines was measured as a fiber diameter. At least 200 fibers were measured. Regarding fiber diameters obtained in such a manner, lognormal plotting was performed with a fiber diameter on the horizontal axis and a cumulative frequency on the vertical axis, and a value corresponding to a cumulative frequency of 50% was obtained as a mean fiber diameter. A geometric standard deviation which represents distribution of fiber diameters was calculated by reading a fiber diameter of a cumulative frequency of 50% and a fiber diameter of a cumulative frequency of 84% from the result of the lognormal plotting and using the following expression.

Geometric standard deviation[−]=cumulative frequency 84% fiber diameter/cumulative frequency 50% fiber diameter (Flexural Rigidity)

An elongated test sample having a size of 150 mm×20 mm was cut out from the filter medium 10 and was placed to be projected horizontally from a horizontal stand using, as a pressing part, an area at a range of 40 mm from one end of the test sample in the longitudinal direction. Using a projection length of 110 mm at this time as a measurement length, displacement in the vertical direction which hangs down from the horizontal stand by self-weight was measured, and flexural rigidity was calculated with the following expression.

Flexural rigidity[gf·mm]=basis weight of filter medium 10×(measurement length)⁴/8/displacement (Pressure Loss of Air Filter Unit)

Pleating was applied to a filter medium 10 to prepare a processed filter medium having a zigzag shape of 610 mm×610 mm×290 mm (Height×Width×Depth). Furthermore, the shape of the processed filter medium was maintained as a zigzag shape by the embossed projections 20A to 20E, and the processed filter medium was held in the frame body 14 in such a state so as to prepare the air filter unit 1.

The prepared air filter unit 1 was set in a rectangular duct. An air flow was adjusted to set the air quantity to 56 m³/minute, a pressure was measured at an upstream side and a downstream side of the air filter unit 1 using a manometer, and a difference between pressures at upstream and downstream sides was obtained as a pressure loss of the air filter unit.

(Collection Efficiency of Air Filter Unit)

The air filter unit 1 was set in a rectangular duct as with measurement of a pressure loss of the air filter unit. An air flow was adjusted to set the air quantity to 56 m³/minute, and PSL particles with a diameter of 0.3 µm was introduced to an upstream side of the air filter unit 1. Concentration of PSL particles was measured at an upstream side and a downstream side of the air filter unit 1 using a light-scattering particle counter, and the collection efficiency of the air filter unit 1 was obtained according to an expression similar to that of collection efficiency of a filter medium.

(Pressure Loss Due to Structure of Air Filter Unit)

A pressure loss (structural resistance) due to the structure of the filter unit 1 was calculated from a pressure loss of the air filter unit 1 and a pressure loss of the filter medium 10 according to the following expression. In measurement of a pressure loss of the air filter unit 1, the filter medium passing speed of air at the air filter unit 1 was 4 cm/second. Consequently, a pressure loss at the filter medium 10 is corrected using a filter medium passing speed of air as represented by the following expression.

Structural resistance of air filter unit=pressure loss at air filter unit 1−pressure loss at filter medium 10×(4.0/5.3)

Example

In order to check the effect of the present embodiment, a filter unit provided with the following filter medium was prepared (Samples 1 to 9).

(Sample 1)

Preparation of Principal Collection Layer 22 (Porous PTFE Film)

Hydrocarbon oil ("IP SOLVENT 2028" manufactured by IDEMITSU KOSAN CO., LTD.) of 33.5% by mass at 20° C. was added as an extruded liquid lubricant per 1 kg of PTFE fine powder ("POLYFLON FINE POWDER F106" manufactured by Daikin Industries, Ltd.) having a mean molecular weight of 6,500,000 and was mixed. Next, the obtained mixture was extruded using a paste extruding device to obtain a compact having a round-bar shape. The molded body having a round-bar shape was shaped into a film form by a calendar roll heated to 70° C. so as to obtain a PTFE film. The film is carried through a hot-air drying furnace of 250° C. to vaporize and remove hydrocarbon oil so as to obtain an unbaked PTFE film having a band form with a mean width of 150 mm. Next, the unbaked PTFE film was stretched at a stretching magnification of 5 times in the longitudinal direction. The stretching temperature was 250° C. Next, the unbaked film which had been stretched was stretched at a stretching magnification of 32 times in the width direction using a tenter capable of successive clipping, and heat fixing was applied. The stretching temperature at this time was 290° C. and the heat fixing temperature was 390° C. A principal collection layer 22 which is a porous PTFE film (having a filling rate of 4.0%, a mean fiber diameter of 0.053 μm and a thickness of 10 μm) was obtained in such a manner.

Air-Permeable Support Layers 26 and 28

A spunbond nonwoven fabric (having a mean fiber diameter of 24 μm, basis weight of 40 g/m² and a thickness of 0.2 mm) made of fiber with a core-sheath structure having PET as a core and PE as a sheath was used as the air-permeable support layers 26 and 28 illustrated in FIG. 4. The spunbond nonwoven fabric was joined with both surfaces of the obtained porous PTFE film which is a principal collection layer 22 by thermal fusion using a laminate apparatus so as to obtain a PTFE laminate. A pressure loss and dust collection efficiency of the PTFE laminate obtained in such a manner were 80 Pa and 99.99% according to the measurement method described above. The pressure loss and the collection efficiency are substantially the characteristics of a porous PTFE film.

Air-Permeable Cover Layer 24

A spunbond nonwoven fabric (having basis weight of 10 g/m² and a thickness of 0.15 mm) made of PP which was continuous fiber having a mean fiber diameter of 20 μm was used as an air-permeable cover layer 24.

Pre-Collection Layer 20

A melt blown nonwoven fabric (having basis weight of 15 g/m² and a thickness of 0.12 mm) made of PP which was fiber having a mean fiber diameter of 1.2 μm was used as a pre-collection layer 20. A spunbond nonwoven fabric which was the air-permeable cover layer 24 and a melt blown nonwoven fabric which was the pre-collection layer 20 were heat-laminated at 110° C. using 2 g/m² of ethylene-vinyl acetate copolymer (EVA) hot melt adhesive so as to obtain a PP laminate (having a thickness of 0.14 mm). The pressure loss and the dust collection efficiency of the PP laminate obtained in such a manner were 60 Pa and 60% according to the measurement method described above. The pressure loss and the collection efficiency are substantially the characteristics of a melt blown nonwoven fabric.

Finally, the PTFE laminate and the PP laminate were heat-laminated at 110° C. using 2 g/m² of EVA hot melt adhesive so as to obtain a filter medium 10 having the layer structure illustrated in FIG. 5. The thickness of the filter medium 10 was 0.64 mm.

The pressure loss and the dust collection efficiency of the filter medium 10 were 170 Pa and 99.995% according to the measurement method described above. There was no rise in pressure loss due to heat lamination. The pressure loss and the collection efficiency are substantially the characteristics obtained by the pre-collection layer 20 and the principal collection layer 22. In addition, the thickness of the filter medium 10 was 0.64 mm.

Embossing was applied to the prepared filter medium 10 using a device provided with a roll-shaped embossing die. Here, embossing was applied so as to form distribution of projection heights H so that the projection height H of the embossed projections 20A to 20E becomes 4 mm at a position closest to a summit of a mountain fold and the projection height H changes gradually along the X direction. The embossed projections 20A to 20E of convex projections and concave projections were provided at the filter medium 10 in such a manner.

Thereafter, pleating was applied with a rotary-type folding machine so as to create mountain folds and valley folds for 260 mm each, so as to produce a filter medium 10 having a zigzag shape as illustrated in FIG. 2A.

Here, the maximum projection height of the embossed projections (not including the thickness of the filter medium 10) was changed to various values, and the ratio of the folding width of the filter medium 10 to the interval between summits of mountain folds (or valley floors of valley folds) was also changed to various values as indicated as Samples 1 to 7. For example, it is shown that Sample 4 has a maximum projection height (not including the thickness of the filter medium 10) of 3.1 mm and a ratio (not including the thickness of the filter medium 10) of the folding width of the filter medium 10 to the interval between summits of mountain folds (or valley floors of valley folds) of 42 as indicated in the following table.

The obtained pleated filter medium 10 was fixed to a frame body 14 made of aluminum. The periphery of the filter medium 10 was bonded with the frame body 14 with urethane adhesive for sealing so as to obtain an air filter unit 1.

The respective specifications and measurement results of the samples are indicated in the following table. "Structure part resistance" in the table is obtained by the calculation method of "Structural resistance of air filter unit" described above. "Filter medium part resistance" is obtained by subtracting "Structure part resistance" from "Pressure loss" at an air filter unit of each sample. In addition, an allowable upper limit of a pressure loss at the air filter unit 1 was set to 210 Pa.

TABLE 1

| | MAXIMUM PROJECTION HEIGHT OF EMBOSSED PROJECTIONS (mm) (NOT INCLUDING THICKNESS OF FILTER MEDIUM) | RATIO OF FOLDING WIDTH TO INTERVAL BETWEEN SUMMITS OF MOUNTAIN FOLDS (NOT INCLUDING THICKNESS OF FILTER MEDIUM) | AIR FILTER UNIT ||||
|---|---|---|---|---|---|---|
| | | | PRESSURE LOSS (Pa) | COLLECTION EFFICIENCY (%) | LIFE | STRUCTURE PART RESISTANCE (Pa) | FILTER MEDIUM PART RESISTANCE (Pa) |
| SAMPLE 1 | 6.9 | 19 | 250 | 99.95 | SAME LEVEL AS GLASS FIBER FILTER MEDIUM | 40 | 210 |

TABLE 1-continued

|  | MAXIMUM PROJECTION HEIGHT OF EMBOSSED PROJECTIONS (mm) (NOT INCLUDING THICKNESS OF FILTER MEDIUM) | RATIO OF FOLDING WIDTH TO INTERVAL BETWEEN SUMMITS OF MOUNTAIN FOLDS (NOT INCLUDING THICKNESS OF FILTER MEDIUM) | AIR FILTER UNIT | | | | |
|---|---|---|---|---|---|---|---|
|  |  |  | PRESSURE LOSS (Pa) | COLLECTION EFFICIENCY (%) | LIFE | STRUCTURE PART RESISTANCE (Pa) | FILTER MEDIUM PART RESISTANCE (Pa) |
| SAMPLE 2 | 5.4 | 24 | 205 | 99.97 | SAME LEVEL AS GLASS FIBER FILTER MEDIUM | 45 | 160 |
| SAMPLE 3 | 4.4 | 29 | 190 | 99.99 | SAME LEVEL AS GLASS FIBER FILTER MEDIUM | 50 | 140 |
| SAMPLE 4 | 3.1 | 42 | 155 | 99.995 | SAME LEVEL AS GLASS FIBER FILTER MEDIUM | 55 | 100 |
| SAMPLE 5 | 2.4 | 54 | 190 | 99.999 | SAME LEVEL AS GLASS FIBER FILTER MEDIUM | 110 | 80 |
| SAMPLE 6 | 2.1 | 62 | 205 | 99.9995 | SAME LEVEL AS GLASS FIBER FILTER MEDIUM | 130 | 75 |
| SAMPLE 7 | 1.9 | 68 | 220 | 99.9999 | SAME LEVEL AS GLASS FIBER FILTER MEDIUM | 150 | 70 |

"Life" in the above table means the amount of collected dust (g/m²) per unit area of a filter medium when rise of a pressure loss of 250 Pa from an initial pressure loss occurs in a state where ventilation is performed at a rated air quantity (e.g., 56 m³/minute) in actual environment. "Same level as glass fiber filter medium" in the table means that the length of the life is at the same level as that of a glass fiber filter medium used in a conventional air filter unit, and indicates that the amount of dust is more than or equal to 10 (g/m²). "Shorter than glass fiber filter medium" means that the "Life" is shorter than the "Life" of a conventional glass fiber filter medium and this is inappropriate as a filter medium. When the mean fiber diameter is more than or equal to 2 μm, the "Life" shortens and this is unfavorable in practice.

When the collection efficiency at the pre-collection layer 20 is more than or equal to 50%, the life of the filter medium 10 can be extended to the same level as the life of a glass fiber filter medium according to the table.

It is shown from the results indicated in the table that it is preferable that the ratio of the folding width (depth dimension) of the filter medium 10 having a zigzag shape to the interval between summits of mountains folds (or valley floors of valley folds) of the filter medium 10, not including the thickness of the air filter medium, is 21 to 65, inclusive, from a point of view to suppress the pressure loss. More specifically, it is shown from Samples 1 to 7 that it is more preferable that the ratio is 24 to 62, inclusive. When the ratio becomes higher, the structure part resistance increases, and this causes an increase in pressure loss. When the ratio becomes lower, the filter medium part resistance increases, and this causes an increase in pressure loss. In this regard, it is shown from Samples 1 to 7 that it is more preferable when the ratio is 24 to 62, inclusive. Further preferably, the ratio is 29 to 54, inclusive.

It is shown that it is preferable that the maximum projection height of the embossed projections 20A to 20E, not including the thickness of the filter medium 10, is 2.0 to 6.0 mm, inclusive, from a point of view to suppress the pressure loss. More specifically, it is shown from Samples 1 to 7 that it is more preferable that the maximum projection height is 2.1 to 5.4 mm, inclusive. Further preferably, the maximum projection height is 2.4 to 4.4 mm, inclusive.

Although the above description has given detailed explanation on a filter medium for an air filter and an air filter unit of the present invention, the present invention is not limited to the above embodiment, and it will be obvious that various improvements or changes may be made without departing from the scope of the present invention.

What is claimed is:

1. A filter medium for an air filter collecting dust in an air flow, the filter medium comprising:
 a principal collection layer including a porous polytetrafluoroethylene film,
 a pre-collection layer located at an upstream side of the air flow relative to the principal collection layer, the pre-collection layer being configured to collect a part of dust in the air flow; and
 an air-permeable cover layer positioned as an outermost layer of the filter medium at the upstream side of the air flow, the air-permeable cover layer allowing dust in the air flow to pass therethrough, and the air-permeable cover layer suppressing deformation of a surface of the filter medium by pressing force from outside,
 a surface of the filter medium being provided with a plurality of embossed projections,
 the filter medium being maintained in a zigzag shape obtained by folding so as to create mountain folds and valley folds, and
 the plurality of embossed projections being provided between each adjacent mountain fold and valley fold.

2. The filter medium for an air filter according to claim 1, wherein
 the principal collection layer collects dust that passes through the pre-collection layer.

3. The filter medium for an air filter according to claim 1, further comprising
 an air-permeable support layer positioned on a downstream side of the air flow relative to the principal collection layer, the air-permeable support layer supporting the principal collection layer.

4. The filter medium for an air filter according to claim 1, comprising
 an air-permeable support layer positioned on an upstream side of the air flow relative to the principal collection layer so as to be adjacent to the principal collection layer, the air-permeable support layer supporting the principal collection layer.

5. The filter medium for an air filter according to claim 1, wherein
 when a flow velocity of the air flow is 5.3 cm/second
 a pressure loss of the air-permeable cover layer is less than or equal to 10 Pa,
 a pressure loss of the pre-collection layer is less than or equal to 80 Pa, and
 a pressure loss of the principal collection layer is less than or equal to 100 Pa.

6. The filter medium for an air filter according to claim 1, wherein
 collection efficiency of the pre-collection layer in collecting dust having a particle diameter of 0.3 μm is more than or equal to 50%, and
 collection efficiency of the principal collection layer in collecting dust having a particle diameter of 0.3 μm is more than or equal to 99.9% in a destaticized state.

7. The filter medium for an air filter according to claim 1, wherein
 a ratio of a depth dimension of the zigzag shape to an interval between summits of the mountain folds or valley floors of the valley folds of the filter medium, not including a thickness of the filter medium, is 21 to 65.

8. The filter medium for an air filter according to claim 1, wherein
 a maximum projection height of the embossed projections, not including a thickness of the filter medium for an air filter, is 2.0 to 6.0 mm.

9. The filter medium for an air filter according to claim 1, wherein
 the air-permeable cover layer is made of a spunbond nonwoven fabric.

10. The filter medium for an air filter according to claim 1, wherein
 a collection efficiency of dust with a particle diameter of 0.3 μm of the air-permeable cover layer is substantially zero.

11. An air filter unit comprising:
 a processed filter medium including
  a principal collection layer including a porous polytetrafluoroethylene film,
  a pre-collection layer located at an upstream side of the air flow relative to the principal collection layer, the pre-collection layer being configured to collect a part of dust in the air flow, and
  an air-permeable cover layer positioned as an outermost layer of the filter medium at the upstream side of the air flow, the air-permeable cover layer allowing dust in the air flow to pass therethrough, and the air-permeable cover layer suppressing deformation of a surface of the filter medium by pressing force from outside,
 the processed filter medium having a zigzag shape obtained by folding an unprocessed filter medium so as to create mountain folds and valley folds, a surface of the processed filter medium being provided with a plurality of embossed projections between each adjacent mountain fold and valley fold; and
 a frame body holding the processed filter medium,
 each of the embossed projections of the processed filter medium contacting one of embossed projections provided on a facing surface of the processed filter medium to maintain the zigzag shape.

12. The air filter unit according to claim 11, wherein
 the air-permeable cover layer is made of a spunbond nonwoven fabric.

13. The air filter unit according to claim 11, wherein
 a collection efficiency of dust with a particle diameter of 0.3 μm of the air-permeable cover layer is substantially zero.

* * * * *